(12) United States Patent
Thandu et al.

(10) Patent No.: US 7,538,722 B2
(45) Date of Patent: May 26, 2009

(54) INTELLIGENT UTILIZATION OF BATTERY AND BANDWIDTH RESOURCES IN MOBILE DEVICES

(75) Inventors: Balasubramaniam K. Thandu, Cedar Park, TX (US); Prabha Aithal, Austin, TX (US)

(73) Assignee: AT&T Mobility II LLC, Atlanta, GA (US)

( * ) Notice: Subject to any disclaimer, the term of this patent is extended or adjusted under 35 U.S.C. 154(b) by 353 days.

(21) Appl. No.: 11/343,513

(22) Filed: Jan. 30, 2006

(65) Prior Publication Data

US 2006/0256005 A1 Nov. 16, 2006

Related U.S. Application Data

(63) Continuation of application No. 10/984,100, filed on Nov. 8, 2004, now Pat. No. 7,026,984.

(51) Int. Cl.
*G01S 1/02* (2006.01)
*G01C 21/00* (2006.01)

(52) U.S. Cl. ............................ 342/357.06; 342/357.09; 701/213

(58) Field of Classification Search ............ 342/357.01, 342/357.06, 357.09, 357.12; 701/207, 213, 701/214, 215
See application file for complete search history.

(56) References Cited

U.S. PATENT DOCUMENTS

| 5,786,789 | A | 7/1998 | Janky |
| 6,204,808 | B1 | 3/2001 | Bloebaum et al. |
| RE37,256 | E | 7/2001 | Cohen et al. |
| 6,477,464 | B2* | 11/2002 | McCarthy et al. ............ 701/213 |
| 7,328,103 | B2* | 2/2008 | McCarthy et al. ............ 701/213 |
| 2004/0037313 | A1* | 2/2004 | Gulati et al. ................. 370/465 |
| 2004/0111535 | A1* | 6/2004 | Boucher et al. ............. 709/250 |
| 2007/0219715 | A1* | 9/2007 | Uyeki et al. ................. 701/209 |

* cited by examiner

*Primary Examiner*—Dao L Phan
(74) *Attorney, Agent, or Firm*—Parks Knowlton LLC; Paul Knowlton, Esq.; Adam J. Citrin, Esq.

(57) ABSTRACT

A programmable intelligent activation module to intelligently allow access to GPS resources is provided. In accordance with pre-programmed settings, an intelligent activation module will control the frequency by which a GPS module is allowed to access a GPS or GSM network in order to acquire location information of a mobile device equipped with GPS equipment. By controlling access to a GPS or GSM network, network resources such as bandwidth are conserved unless actually needed as is determined by the intelligent activation module. Similarly, battery resources for the mobile device are also conserved in that unnecessary activation of the GPS module is prevented until such activation is actually needed. The intelligent activation module can be programmed with a variety of settings including speed, map deltas, final destination information, or settings as pre-determined by a user of the mobile device.

34 Claims, 13 Drawing Sheets

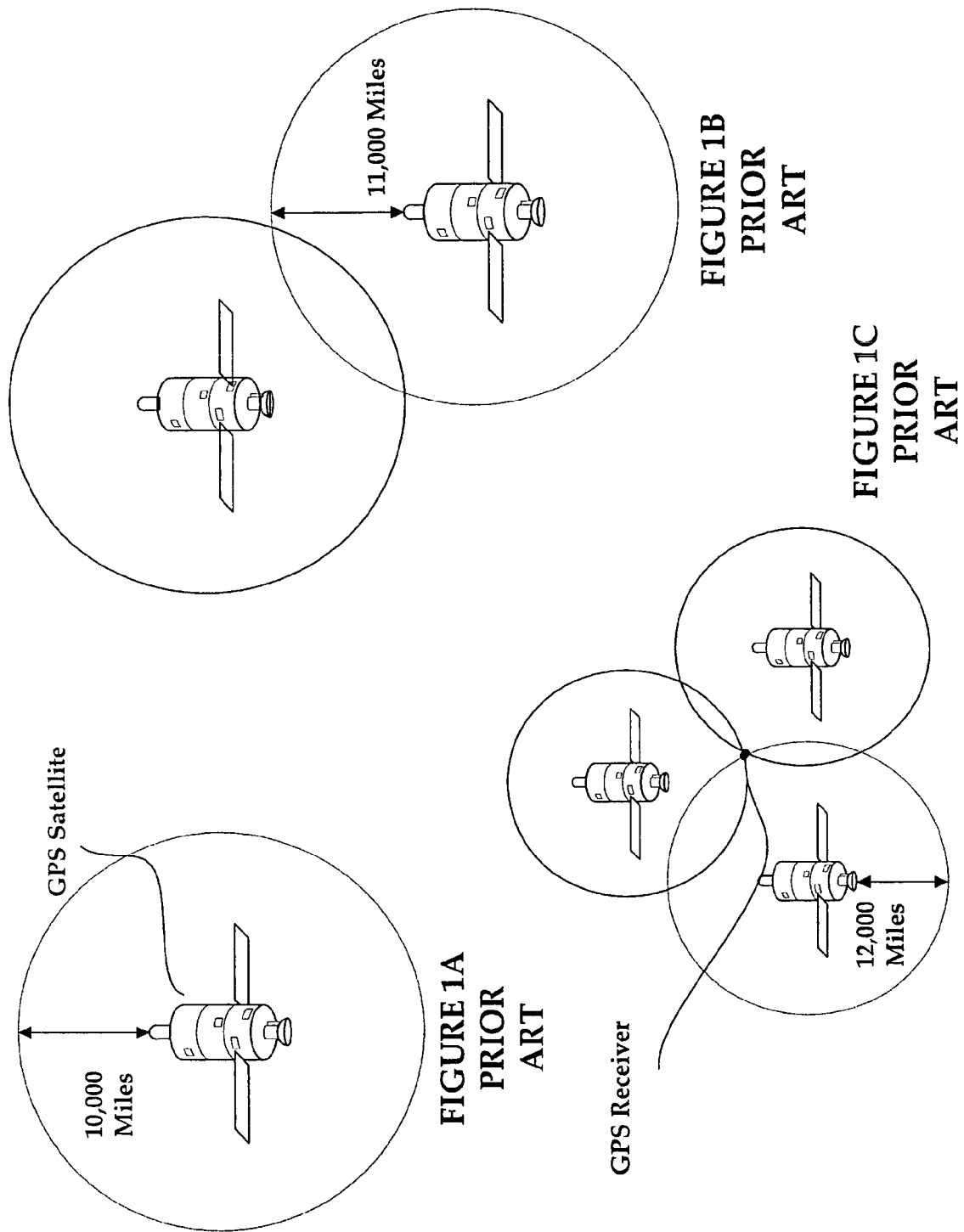

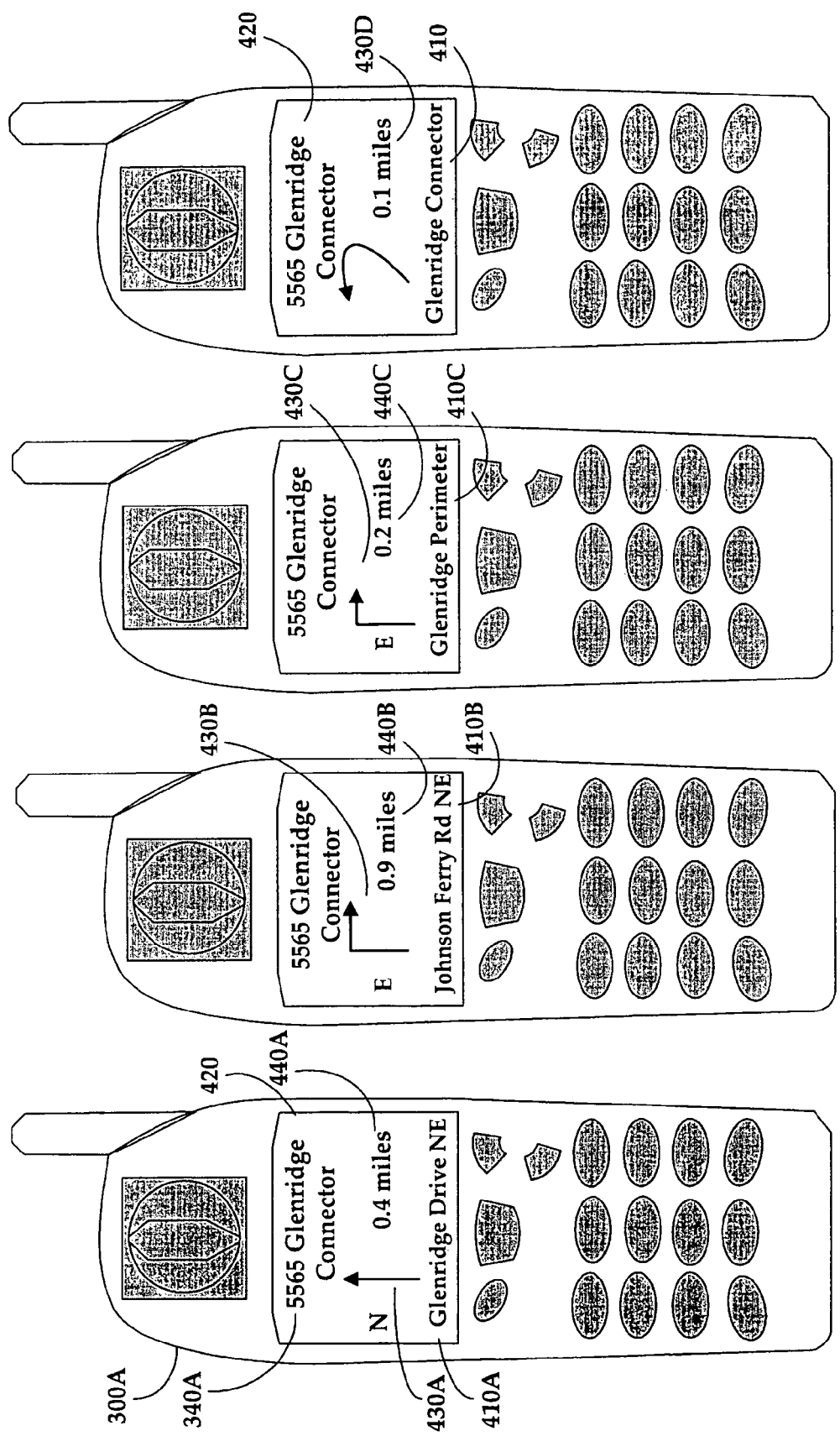

INTELLIGENT UTILIZATION OF BATTERY AND BANDWIDTH RESOURCES IN MOBILE DEVICES

CROSS REFERENCE TO RELATED APPLICATIONS

This application is a continuation of U.S. patent application Ser. No. 10/984,100 filed Nov. 8, 2004, now U.S. Pat. No. 7,026,984, and entitled "Intelligent Utilization of Resources in Mobile Devices." The disclosure of this commonly owned application is incorporated herein by reference in its entirety.

BACKGROUND

1. Field of the Invention

The present invention relates to use of the Global Positioning System (GPS) and other location based resources in mobile devices such as cellular phones and handheld devices. More specifically, the present invention relates to intelligent utilization of GPS and location based resources in a mobile device in order to preserve battery life of the mobile device and minimize network bandwidth resources accessed by the mobile device.

2. Description of the Related Art

Operation of the GPS

The GPS is a series of twenty-four space-based satellites transmitting signals to a GPS receiver on the ground. Each GPS satellite transmits data that indicates that particular satellite's location and the current time. All GPS satellites synchronize operations so that these repeated signals are transmitted at the same instant as provided by atomic clocks at the U.S. Naval Observatory and an atomic clock on board each GPS satellite.

Signals emitted by GPS satellites arrive at a GPS receiver at different times because some GPS satellites are farther away than other GPS satellites in relation to the GPS receiver; information relating to the location of each GPS satellite is included in GPS satellite transmissions. The distance to a GPS satellite from a GPS receiver can be determined by the time it takes for a GPS satellite signal to reach a GPS receiver. The GPS receiver can calculate its location in relation to these GPS satellite transmissions through a process known as trilateration. Through trilateration, a GPS receiver measures the distance from the GPS satellite using travel time of the GPS satellite signals.

For example, the distance between a GPS receiver and a GPS satellite might be 10,000 miles. The location of the receiver relative to the particular GPS satellite is limited to a sphere with a radius of 10,000 miles, the GPS satellite serving as the center point as shown in FIG. 1A. The distance between the same GPS receiver and a second GPS satellite might be 11,000 miles. As was the case with the first GPS satellite, the location of the receiver relative to the second satellite is limited to a sphere with a radius of 11,000, the second GPS satellite serving as the center point as shown in FIG. 1B. Combining the information from these two GPS satellites relative to the GPS receiver, we can determine that the GPS receiver is located "somewhere" where the two spheres intersect. By obtaining a relative measurement from a third GPS satellite (e.g., 12,000 miles), the location of the GPS receiver is further narrowed to a point where the 10,000 miles and 11,000 mile spheres intersect with the 12,000 mile sphere as shown in FIG. 1C.

Mobile Devices and the GPS

With the proliferation of mobile devices such as cellular phones—over 150,000,000 cellular phones are presently in service—the mobile device handset has become increasingly functional beyond that of a mere telephonic device. Many cellular phones are now integrated with other mobile features such as a Personal Digital Assistant (PDA), camera, instant messaging and electronic-mail. The Federal Communications Commission, too, recognized this proliferation and the possible safety advantages of equipping mobile devices with GPS tracking under its E911 mandate.

While a 911 emergency phone call placed from a land-line is associated with a phone number assigned to a physical address, a 911 emergency phone call placed from a cellular phone can originate from the user's home but also from, for example, the user's office, while on vacation, or even while stranded in a remote location. Sending an emergency response team to the user's home address when the call was placed in one of these latter locations fails to provide the necessary emergency services where needed but also distracts those services from other possible emergencies. GPS tracking solves this conundrum by associating a phone number with actual physical location. In this regard, GPS technology in cellular handsets and other mobile devices also offers additional commercial advantages such as the user determining their location or obtaining turn-by-turn directions to a particular destination.

Receipt of GPS satellite signals is not a simple feat, however, especially for a mobile device with less power than a conventional GPS receiver that is designed for—and only for—receipt of GPS signals. Mobile devices such as cellular phones are, obviously, phones first and foremost. Additional features such as electronic mail and GPS functionality require additional processing power in the mobile device that represents an additional strain on battery availability in addition to another strain on outside resources such as a GSM (Global System for Mobile Communications) network that allows a user to connect to a proprietary cellular network via local base stations.

Representing a further strain on battery and network resources is the fact that GPS signals shift in frequency due to the relative motion between, for example, a handset GPS receiver and the constant motion of GPS satellites. This Doppler frequency shift requires the GPS receiver to, first, find the frequency of the signal before the GPS receiver can lock onto the signal and make a determination of location. As such, prior knowledge of a GPS satellite's position and velocity data and the initial handset receiver position can reduce the number of frequencies to be searched because the GPS receiver directly computes the Doppler frequency shift instead of searching over a whole possible frequency range.

Many GPS equipped cellular phones are also equipped with technology known as the Assisted Global Positioning System ("A-GPS"). A-GPS uses a combination of GPS satellites and cellular phone base stations to pinpoint location of the mobile device and its GPS receiver and to offer a determination of location that is more accurate than GPS alone. Mobile device GPS receivers, in correlation with an estimate of the mobile handset's location as determined by a cell-sector, can predict with greater accuracy the GPS signal the handset will receive and send that information to the mobile device handset. With this assistance, the size of the frequency search space is reduced and the time-to-first-fix (TTFF) of the signal is reduced from minutes to seconds. A-GPS handset receivers can also detect and demodulate signals that are weaker in magnitude than those required by a traditional GPS receiver.

A-GPS requires precise timing information to perform satellite signal processing. A-GPS can utilize precise time from a synchronized network, which provides optimized TTFF and sensitivity, or derive it on either a synchronized or an asynchronous network from aiding data received from an assistance server. The assistance server communicates with the GPS receiver via a wireless network link. The assistance server, generally, provides three types of data to the GPS receiver: GPS satellite orbit and clock information; initial position and time estimate; and for A-GPS-only receivers, satellite selection, range, and range-rate information. The assistance server is also able to compute position solutions, leaving the GPS receiver with the sole job of collecting range measurements. With assistance from the network, the receiver can operate more quickly and efficiently than it would unassisted, because a set of tasks that it would normally handle is shared with the server. The architecture of conventional GPS receiver implementation compared to that of an A-GPS implementation is reflected in FIGS. 2A and 2B, respectively.

A-GPS operates on any air interface network, synchronized or not, without requiring any costly equipment to derive time, and will operate with enhanced efficiency and performance on precisely synchronized networks. The A-GPS architecture, in and of itself, helps increase capabilities on the cellular phone with regard to battery conservation. Nevertheless, constantly querying the GSM Network and/or GPS satellite network represents an ongoing drain on battery power in addition to a strain on requisite networks. Therefore, there is a need in the art for a GPS handset solution that incorporates A-GPS architecture with an intelligent system for making queries of location on an as-needed basis.

BRIEF DESCRIPTION OF THE DRAWINGS

FIGS. 1A-1C illustrates an operation of three GPS satellites to determine a position of a GPS receiver;

FIGS. 4A-4D shows use of the exemplary GPS-equipped cellular telephone to provide turn-by-turn directions;

SUMMARY OF THE INVENTION

Figure 2A:
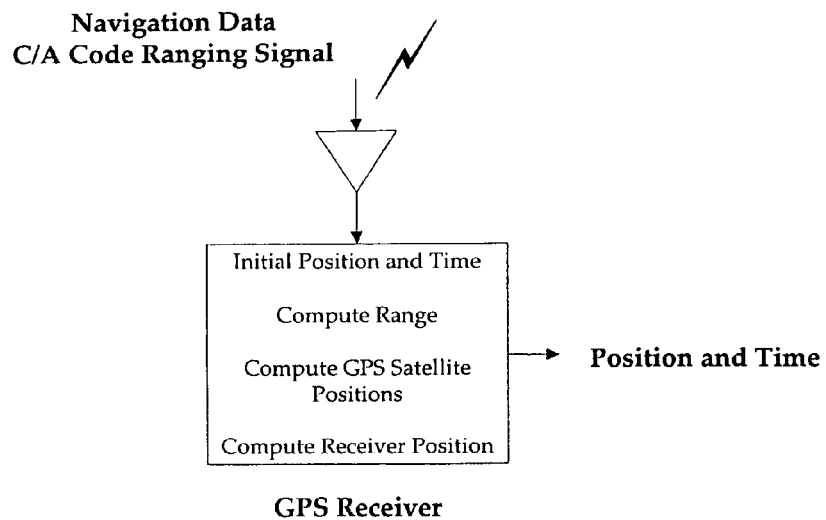
FIGS. 2A and 2B illustrate an operation of a traditional GPS receiver and a GPS engine operating in conjunction with an A-GPS assistance server.
Figure 2B:
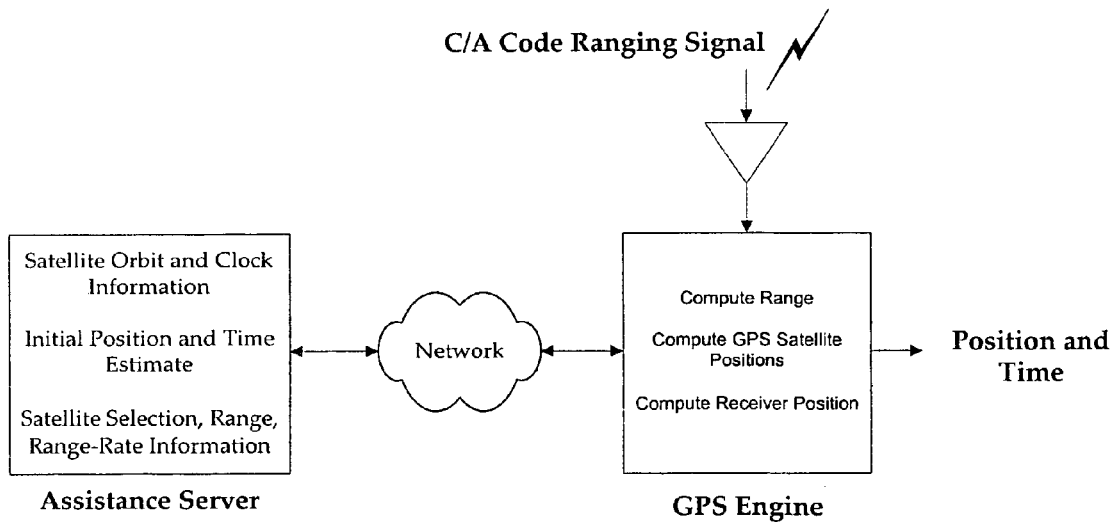

The present invention advantageously provides a mobile device comprising a GPS module and an intelligent activation module. The GPS module comprises a chip configured to receive location based information from at least one network. Location based information can comprise GPS-information that may be provided by a GPS-network. The use of the term 'location based information' throughout the specification is meant to be illustrative and is not to be interpreted as limiting the scope of the invention to only GPS-information. The intelligent activation module is configured to control the activation of the GPS module dependent upon at least one control setting. By intelligently activating the GPS module on an as-needed basis, resources such as network bandwidth and battery power are conserved.

The present invention also provides a method for intelligently utilizing resources in a mobile device by determining when access to a GPS-information network is required as defined by final destination information. According to this method, the intelligent activation module will allow the GPS module to access a GPS-information network when the mobile device is within a defined 'buffer' zone from the final destination.

The present invention also provides a method for intelligently utilizing resources in a mobile device by determining when access to an A-GPS-information network is required as defined by changes in deltas as they related to proximity to a final destination. Access to GPS-information prior to accessing the A-GPS network is limited to GPS-only network information.

The present invention also provides a method for intelligently utilizing resources in a mobile device by determining when access to a GPS-information network is required as defined by a pre-determined user setting related to distance from the final destination. Upon arriving within the predetermined distance from the final setting, the GPS module will regularly access a GPS-information network to obtain location information and provide turn-by-turn directions. All GPS-information queries prior to providing turn-by-turn directions are limited to a determination of location as related to distance from the final location.

The present invention also provides a method for intelligently utilizing resources in a mobile device by determining when access to a GPS-information network is required as defined by speed of the mobile device. If a mobile device is traveling over a certain speed, the intelligent activation module will make a determination that turn-by-turn directions are not required and that information-intensive queries to a GPS-information network should be limited. If the mobile device is traveling under a certain speed, the intelligent activation module will make a determination that turn-by-turn directions are required and that information-intensive queries to a GPS-information network should be more frequent. The present invention also recognizes queries to a network (or lack thereof) dependent on the mobile device traveling at less than a particular speed.

DETAILED DESCRIPTION OF AN EXEMPLARY EMBODIMENT

Figure 3A:
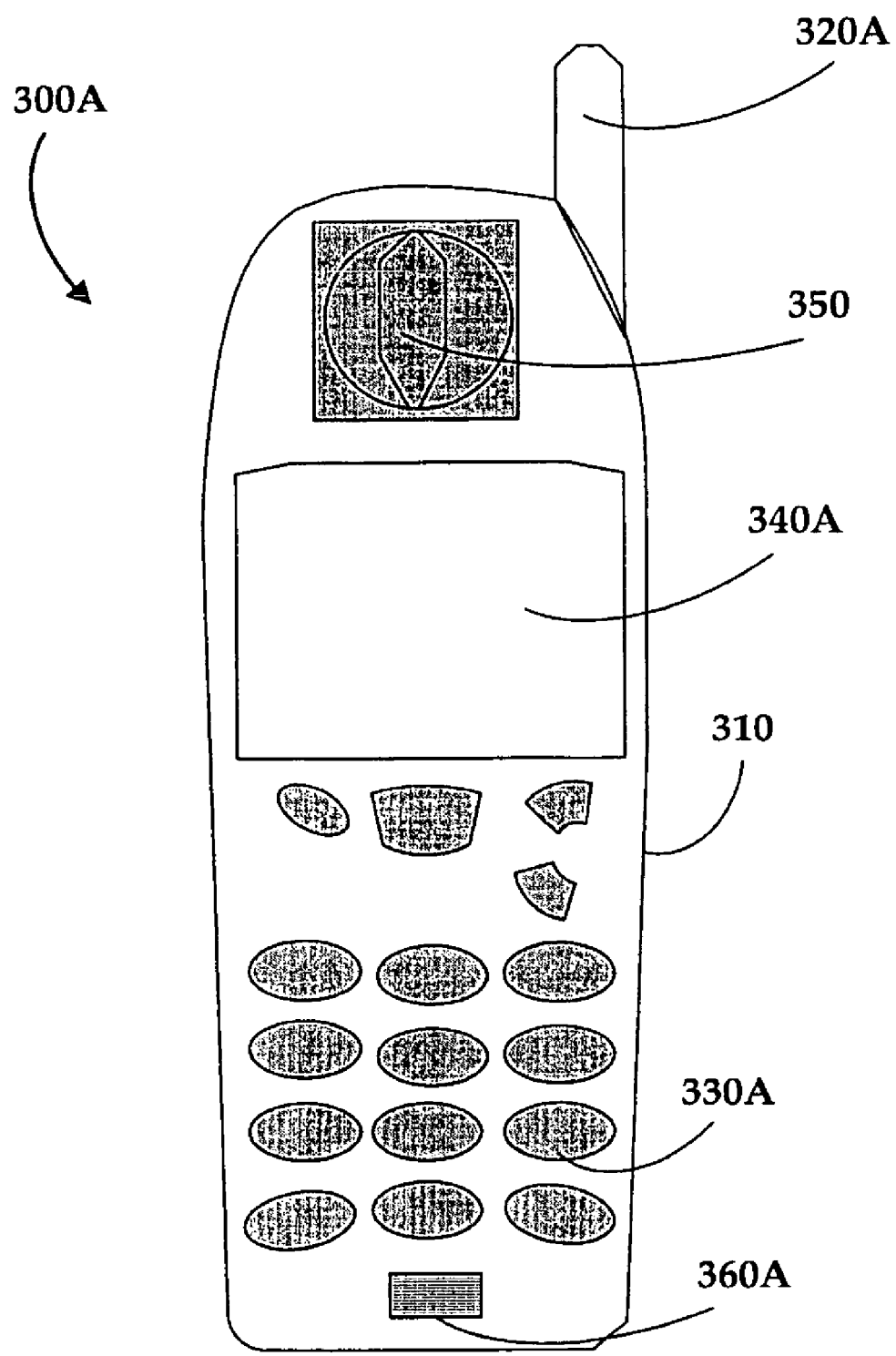
FIGS. 3A and 3B show an exemplary GPS-equipped cellular telephone.
Figure 3B:
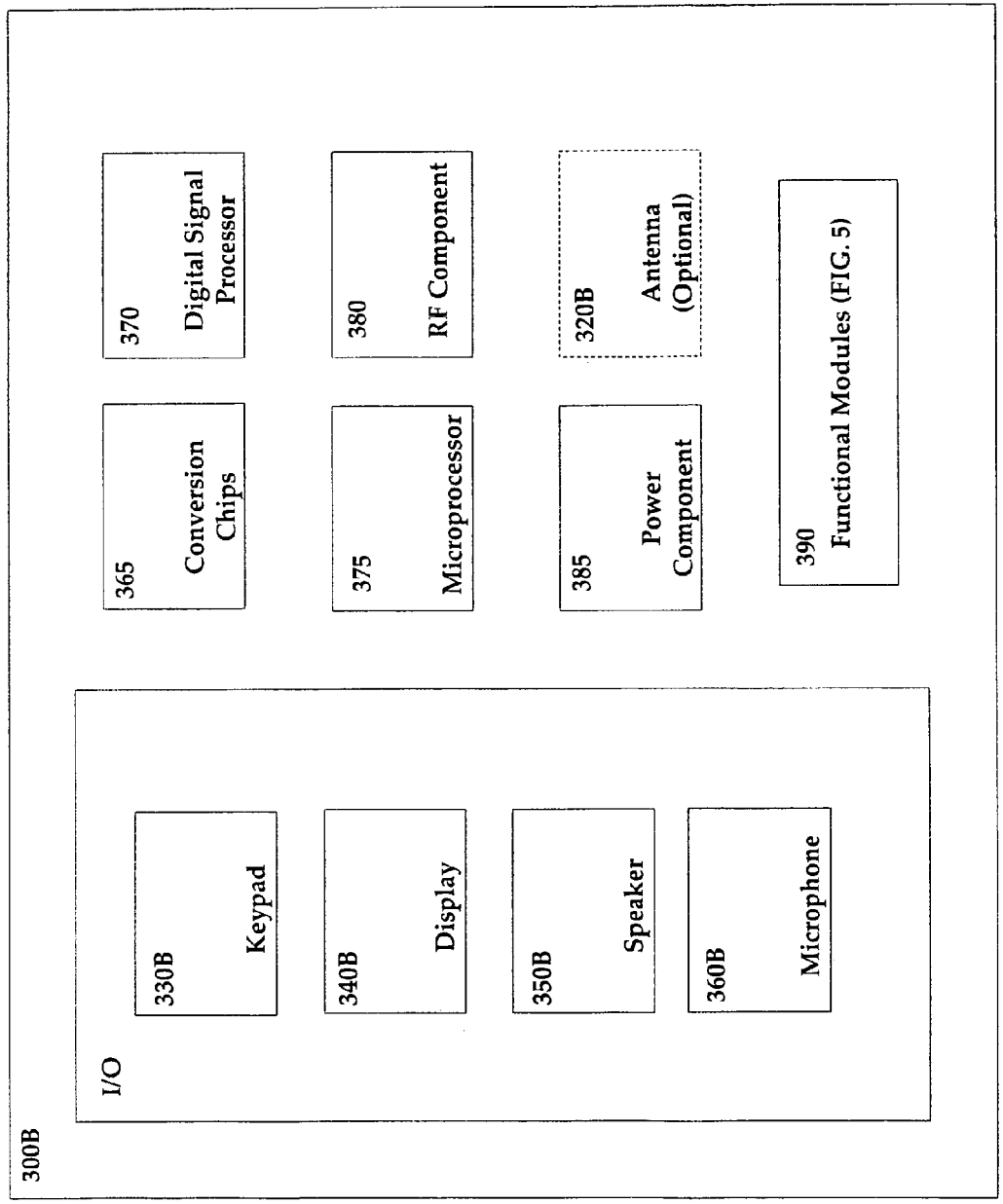

FIG. 3A illustrates an exemplary GPS-equipped mobile device 300A. The mobile device 300A comprises a mobile device housing 310 and antenna outcropping 320A. The mobile device housing 310 is, generally, a lightweight and impact resistant plastic or other contoured molding designed for the ergonomic benefit of the user but also to protect necessary cellular components inside the mobile device housing 310. These components, as illustrated in FIG. 3B, often include, for example, analog-to-digital and digital-to-analog conversion chips 365, a digital signal processor 370, a microprocessor 375, various RF 380 and power components 385, and internal antenna support 320B. The mobile device 300B further comprises functional modules 390, which will be discussed in more detail in connection with FIG. 5. Depending on the particular manufacturer of the mobile device 300, certain components might be absent or integrated with other components.

The mobile device housing 310 is, generally, also constructed to allow for the integration of a keypad 330 and display 340 as well as a speaker 350 (for listening to a phone conversation) and microphone 360 (for engaging in a phone conversation). Many mobile devices 300A also comprise a battery port (not shown) for providing D/C power to a mobile device 300A. Various ports (not shown) may also be provided in the mobile device housing 310 whereby a 'hands-free' ear-piece and microphone can be connected to the mobile device 300A in addition to, for example, an A/C power cord for recharging the mobile device 300A.

Similar ports may be provided for connecting the mobile device 300A with third-party devices designed to be complementary and compliant with the mobile device 300A operating architecture. An example of a third-party device would be a flash memory card for storing, for example, photographs taken by a camera-phone. A port could also allow access to an automobile's on-board computer providing, for example, speed of the automobile as will be described in greater detail in this disclosure.

Figure 10:
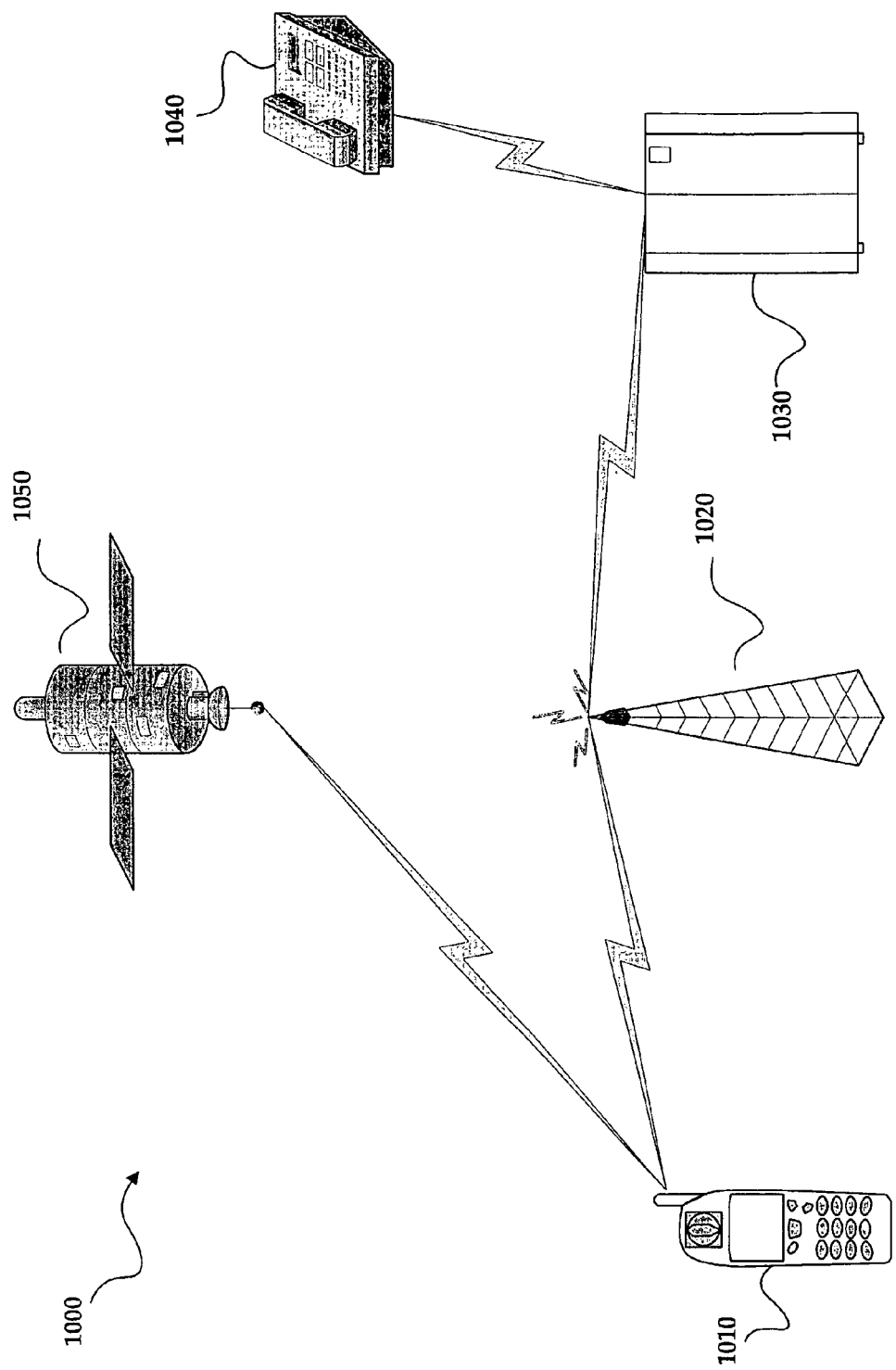
FIG. 10 illustrates an interaction between a GPS-equipped cellular telephone, a base station, a switching station and a GPS satellite.

The antenna outcropping 320A is, generally, utilized when a user makes a cellular phone call. Referring now to FIG. 10, upon initiating the call, a signal is sent from the antenna outcropping 320A of a cellular device 1010 to a base station antenna 1020. The base station 1020, in turn, assigns an available RF channel upon which voice information is transferred to the base station 1020. These voice signals are then sent to a switching station 1030 which transfers the call to its destination 1040. In some embodiments, the antenna outcropping 320A is not necessary due to the power of the RF components housed inside the mobile device housing 310. In some embodiments, like those utilizing GPS and receiving information from a GPS satellite 1050, an antenna outcropping 320A might be preferred to increase the transmission and receipt strength of various signals related to GPS or A-GPS.

FIG. 4 reflects an exemplary use of the GPS-equipped mobile device 300A to provide turn-by-turn directions to a user. In FIG. 4A, for example, the display 340A reflects the present position 410A of the user in addition to a desired destination 420 of the user. The display 340A also reflects the present necessary direction (north) of travel 430A as well as the distance 440A (e.g., 0.4 miles) the user should travel in that particular direction. FIG. 4B reflects a next 'segment' of travel for the user to arrive at their desired destination 420, the user having completed traveling 0.4 miles in a northern direction as reflected in FIG. 4A.

As evidenced in FIG. 4B, the user's present position 410B has changed since the user traversed a distance and direction reflected in FIG. 4A. Additionally, the user will be required to change their direction of travel 430B, in this case, a right hand turn to the east in 0.9 miles as reflected by distance 440B.

FIG. 4C reflects a next 'segment' of travel, the user having traversed the direction and distance reflected in FIG. 4B. In this example, now at a new location 410C, the user is required to make another right hand turn to the east in 0.2 miles as reflected by direction 430C and distance 440C. FIG. 4D continues the turn-by-turn direction example whereby the user now makes their final turn to their desired destination 420.

A desired destination 420 can be provided through a variety of means. For example, a user may manually enter the desired destination 420 into the mobile device 300A through the use of the keypad 330A (FIG. 3A) in response to a graphic user interface provided on the display 340A (FIG. 3A) of the mobile device 300A by GPS or directional software installed on the mobile device 300A. This software can be 'downloaded' to the mobile device 300A or can be 'pre-installed' when a user purchases the mobile device 300A.

Alternatively, the user can provide the desired destination 420 to the mobile device 300A in response to voice prompts from the speaker 350A (FIG. 3A). In response to these prompts, the user can vocally provide information through the microphone 360A whereby voice-recognition software analyzes utterances provided by the user to determine the desired destination 420. The information provided by the user is analyzed by voice-recognition software, which may be installed on the mobile device 300A or at a remote server housed at, for example, a base station may be subsequently confirmed by the user through prompts on the display 340A and responses on the keypad 330A or through prompts by the speaker 350A and responses through the microphone 360A (FIG. 3A). Input related to the desired destination 420 initially provided via the keypad 330A can be confirmed in a similar manner.

The desired destination 420 can also be provided from a remote location (not shown) such as a computer terminal whereby a user provides the necessary information to a user interface hosted by a particular cellular carrier. This information is, in turn, delivered to the mobile device 300A via a wireless transmission. Such a means of providing the desired destination 420 allows for ease of use as the mobile device keypad 330A or microphone 360A may prove cumbersome in providing certain information. A particular starting point (e.g., a present position 410A) can also be provided in any of these methods (e.g., keypad, voice, computer terminal) if the user knows they will be initiating a journey at a later point in time or location.

Figure 5:
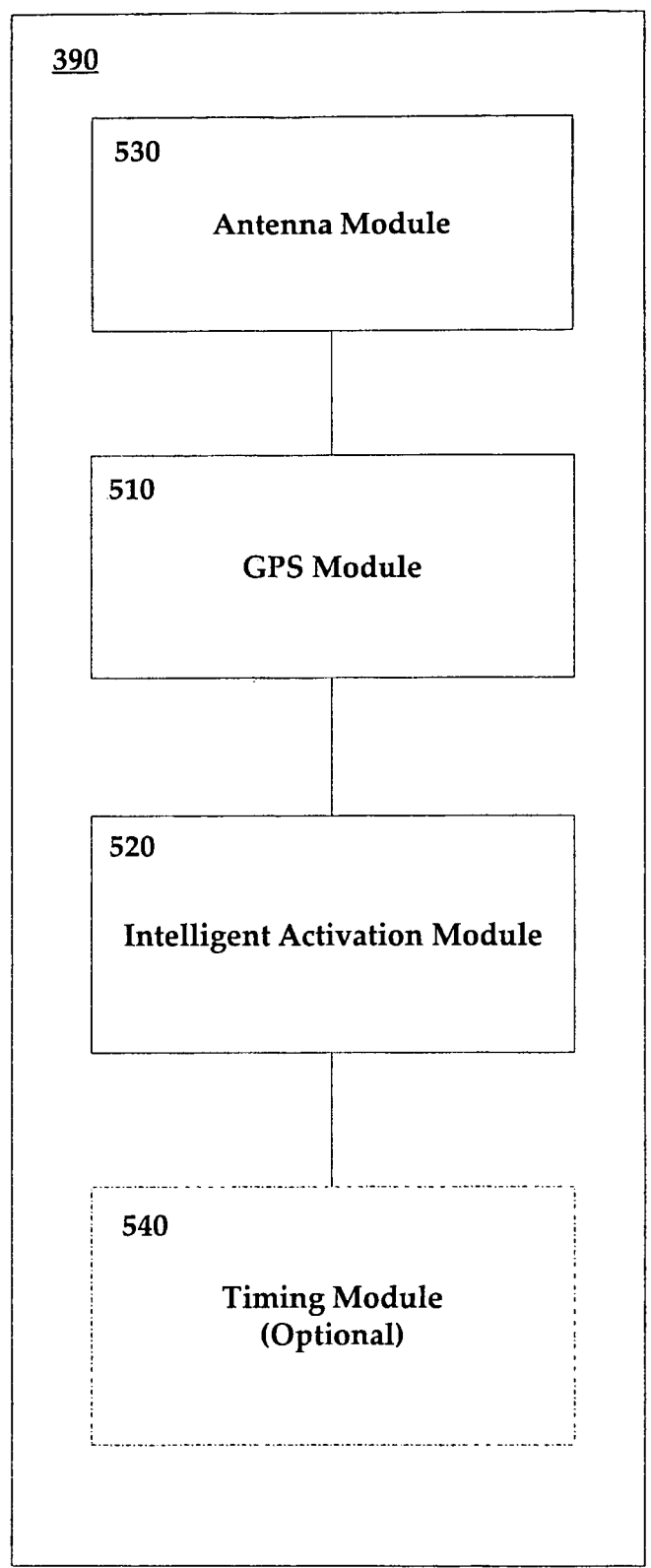
FIG. 5 illustrates a GPS module and intelligent activation module of the present invention as it would interact with an antenna module, according to an exemplary embodiment.

FIG. 5 illustrates the exemplary relationship between a GPS module 510, an intelligent activation module 520, and antenna module 530 of the functional modules 390. The terminology 'GPS module' does not necessarily refer to a GPS-only module. References to a GPS module may also include any other type of location determination software, hardware or a combination of the two. The GPS module 510 comprises, at least, a chip for detecting location (e.g., GPS) signals. The GPS module 510 may also comprise additional hardware, software, or a combination of the two (e.g., software embedded in an ASIC chip) necessary to integrate the chip with the operational architecture of the mobile device 300A (FIG. 3A). Chips configured to detect location (e.g., GPS) signals can detect signals as low as approximately 153 dBm and have a TTFF around 5 seconds with A-GPS and approximately 35 seconds without any network assistance. These chips may have a footprint of approximately 7 square mm. The exact size, signal detection, and TTFF specifications of the chip are immaterial to the scope of the present invention. Any available chip may be utilized within the GPS module 510 of the present invention so long as it is capable of being integrated with the architecture of the mobile device 300A. The exact locale of the GPS module 510 is equally immaterial so long as it is located within or coupled to the mobile device housing 310 as to make it an integrated part of the mobile device 300A.

The exemplary GPS module 510 processes received location based information, be it directly from a GPS satellite or in conjunction with A-GPS, in order to make necessary determinations of location. The GPS module 510 will also interact with various elements of the mobile device 300A such as the speaker 350A (FIG. 3A) and/or display 340A (FIG. 3A) in order to provide turn-by-turn directions as described in FIG. 4 visually and/or audibly. The GPS module 510, in this regard, also comprises the necessary hardware and/or software to convert GPS signals and information into comprehensible information for the user. The GPS module 510 also utilizes information related to a desired destination 420 in order to generate and provide the aforementioned turn-by-turn directions.

The antenna module 530 is, in some embodiments of the present invention, an integrated part of the physical antenna outcropping 320A (FIG. 3A) as reflected in mobile device 300A. Dependent upon the particular architecture of the mobile device 300A and the chip utilized in the GPS module 510, the antenna module 530 can also be an integrated part of the chip whereby the antenna module 530 and GPS module 510 are integrated into one module. In embodiments with an actual antenna outcropping 320A, the antenna module 530 comprises software for processing signals received and transmitted by the antenna outcropping 320A. The antenna outcropping 320A is often comprised of a conical housing and UV-resistant material with a tubular mounting designed for weatherproofing so that the antenna outcropping 320A can withstand various weather environments (e.g., rain or snow). GPS signals are received by the antenna module 530 and, in some embodiments, amplified and relayed to the GPS module 510 for processing. Some embodiments of the present invention might also comprise a timing module 540 to further enhance received GPS signals and improve determination and reliability of location by the chip embedded in the GPS module 510. More specifically, the timing module 540 can readjust, reset, and compensate for any timing errors in a GPS and/or GSM network.

The exemplary intelligent activation module 520 works in conjunction with the GPS module 510 in order to intelligently utilize various GPS resources such as battery power and network bandwidth. The intelligent activation module 520 can be configured with any variety of settings whereby the module 520 will only activate the GPS module 510, or allow for the activation of the GPS module 510, to make a processing heavy inquiry of a GSM and/or GPS network as is absolutely necessary. Such settings include a 'final destination setting,' a 'delta setting,' a 'predetermined setting,' and a 'speed information setting,' each of which are described in greater detail below. Limiting the frequency with which the GPS module 510 accesses a relevant network will result in less strain on the network thereby allowing for increased quality of service for other users in addition to less drain on the battery or other power component 385 (FIG. 3B) of the mobile device 300B.

Some of these settings, such as one utilizing speed information, will require periodic activation of the GPS module 510 to acquire information related to distance traveled since a prior query so that the intelligent activation module 520 can deduce the speed of the mobile device 300A (e.g., distance/time=speed). Other settings, such as a predetermined setting, will only allow for activation of the GPS module 510 at a particular time (e.g., every 30 minutes) or following a particular event (e.g., following the conclusion of a telephone call).

The intelligent activation module 520 comprises the necessary hardware, software, and/or combinations to allow implementation of the various setting described in detail below. These settings can be hardwired into the intelligent activation module 520 as would be the case with an ASIC or be user-determined through pre- or as-needed installation, deletion, or optional utilization by the user. In addition, various algorithms are embodied in the intelligent activation module 520 to make necessary calculations, such as speed of the mobile device 300A based on the provision of elapsed time and distance traveled as provided by various components of the mobile device 300A including, but not limited to, the GPS module 510. Additionally, the intelligent activation module 520 comprises the necessary hardware, software, and/or combination to integrate and interact with other necessary components of the mobile device 300A as well as being able to activate or, as is necessary, suppress the operation of GPS module 510 whereby resources (e.g., battery power and network bandwidth) are conserved.

Figure 6A:
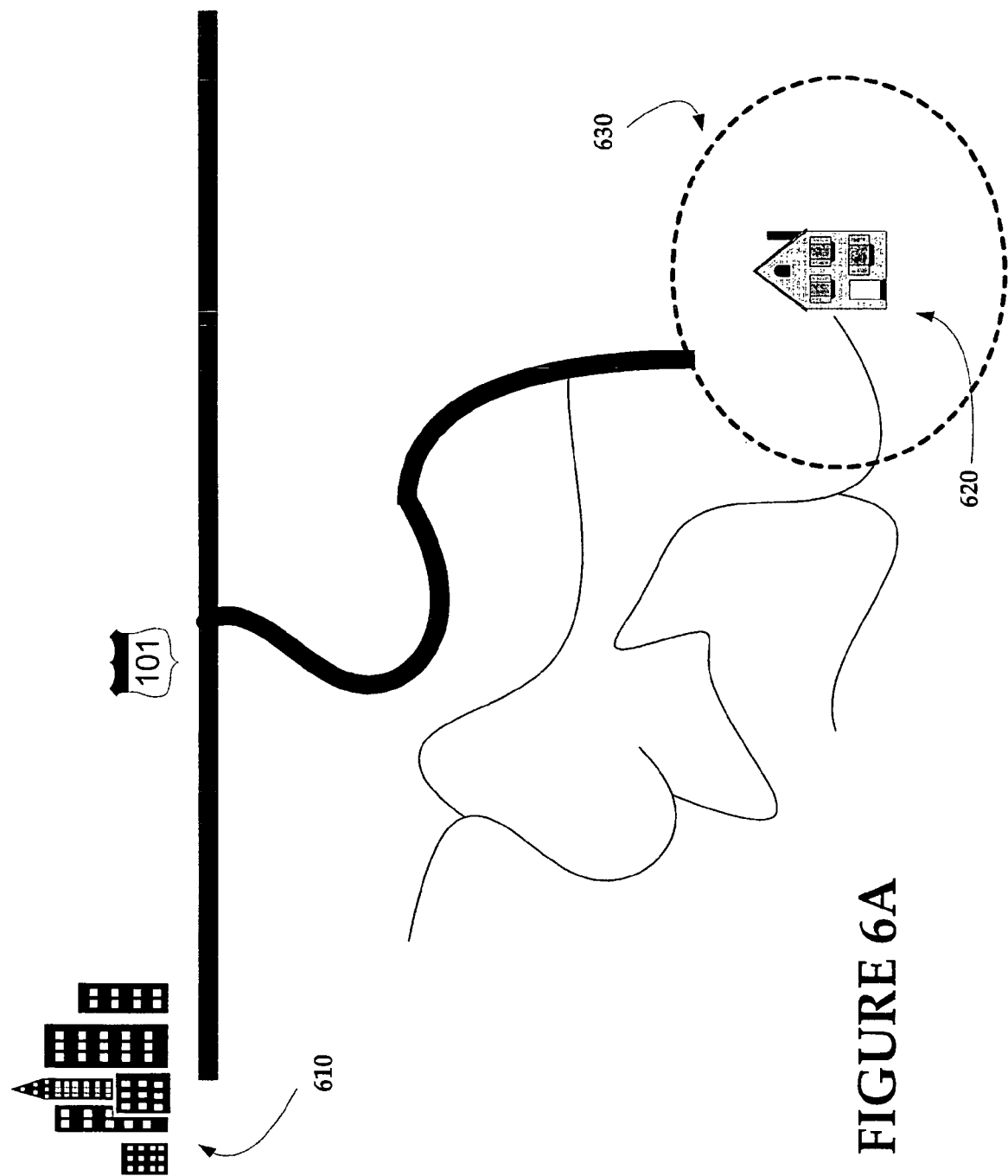
FIG. 6 reflects an exemplary intelligent utilization of GPS resources as they pertain to final destination information.

FIG. 6 reflects intelligent utilization of resources based on final destination information. FIG. 6A reflects an exemplary map wherein a user may begin their journey at Point A 610 and arrive at their destination, Point B 620. Between Point A and Point B are various highways, expressways, city streets, and neighborhood thoroughfares. A user of a GPS-equipped mobile device 300 (FIG. 3) will have varying familiarity with these segments of roadway and will require varying degrees of information as it pertains to turn-by-turn directions for reaching their ultimate destination.

The fact that a user may rely on turn-by-turn directions provided by a GPS-equipped mobile device 300 indicates certain unfamiliarity with the route of their travels from Point A 610 to Point B 620. There is a general presumption, however, that a user of a mobile device 300A with GPS features will have a higher degree of familiarity with their point of origin 610 with regard to utilizing the final destination setting in the intelligent activation module 520 (FIG. 5). The presumption continues that the user will have an increasing need for more detailed directions (e.g., turn-by-turn directions) as they come closer to their final destination 620. In that regard, a user can identify a certain 'buffer' or radius 630 from their final destination in which detailed directions (e.g., turn-by-turn) will be required. Alternatively, the intelligent activation module 520 can make a determination of the 'buffer' radius dependent on the complexity of road, turns and so forth. Any location information provided prior to reaching that 'buffer' 630 can be more generalized in terms of the number of a highway or name of a street on which the user may be traveling in addition to being provided on a less frequent basis.

As more generalized and less frequent information is required outside the buffer 630, the user might be content with location information provided only by a GPS receiver in the mobile device 300A. Due to Doppler Shift and processing power of a mobile device 300A, acquiring location information solely though the mobile device's 300 GPS receiver will be more time consuming (possibly a minute or more) and less accurate. This generalized information, however, will likely be sufficient for extended highway driving or in areas of increased familiarity. As such, outside the buffer region 630, the intelligent activation module 520 can instruct the GPS module 510 (FIG. 5) to utilize only its GPS receiver and/or suppress utilization of available A-GPS features.

Upon approaching their final destination 620 and, more specifically, the 'buffer' region 630 around that final destination 620, the user will need more rapidly provided and increasingly accurate information to make turns on, for example, unfamiliar city and neighborhood streets. The delay and decreased accuracy of the GPS-only receiver on a mobile device 300A will no longer suffice for this purpose. As such, upon arrival at the buffer region 630, the intelligent activation module 520 instructs the GPS module 510 to begin utilizing A-GPS features and to otherwise terminate any suppression of such features that may have existed. With the GPS receiver operating in conjunction with A-GPS, the result is increased accuracy of location information in addition to more rapid provision of that information to the GPS module 510 that, in turn, provides detailed turn-by-turn directions to the user.

In some embodiments of the present invention, the 'buffer' region 630 may only exist around the final destination 620. In other embodiments, there may be a plurality of 'buffer' regions 630. For example, if a user is on an extended journey from their home in California to New York to see family, the user might wish to make a brief stop in Illinois to see friends or other persons of interest.

As such, turn-by-turn directions will also be necessary in the Illinois region. An embodiment providing multiple 'buffer' regions 630 would allow for a 'buffer' region 630 around not only the final destination 620 in New York but also around certain intermediate destinations (e.g., Chicago) where the user is requires detailed driving directions. The buffer region 630 may also be at a starting point 610 (e.g., details as to finding a freeway entrance).

Figure 6B:
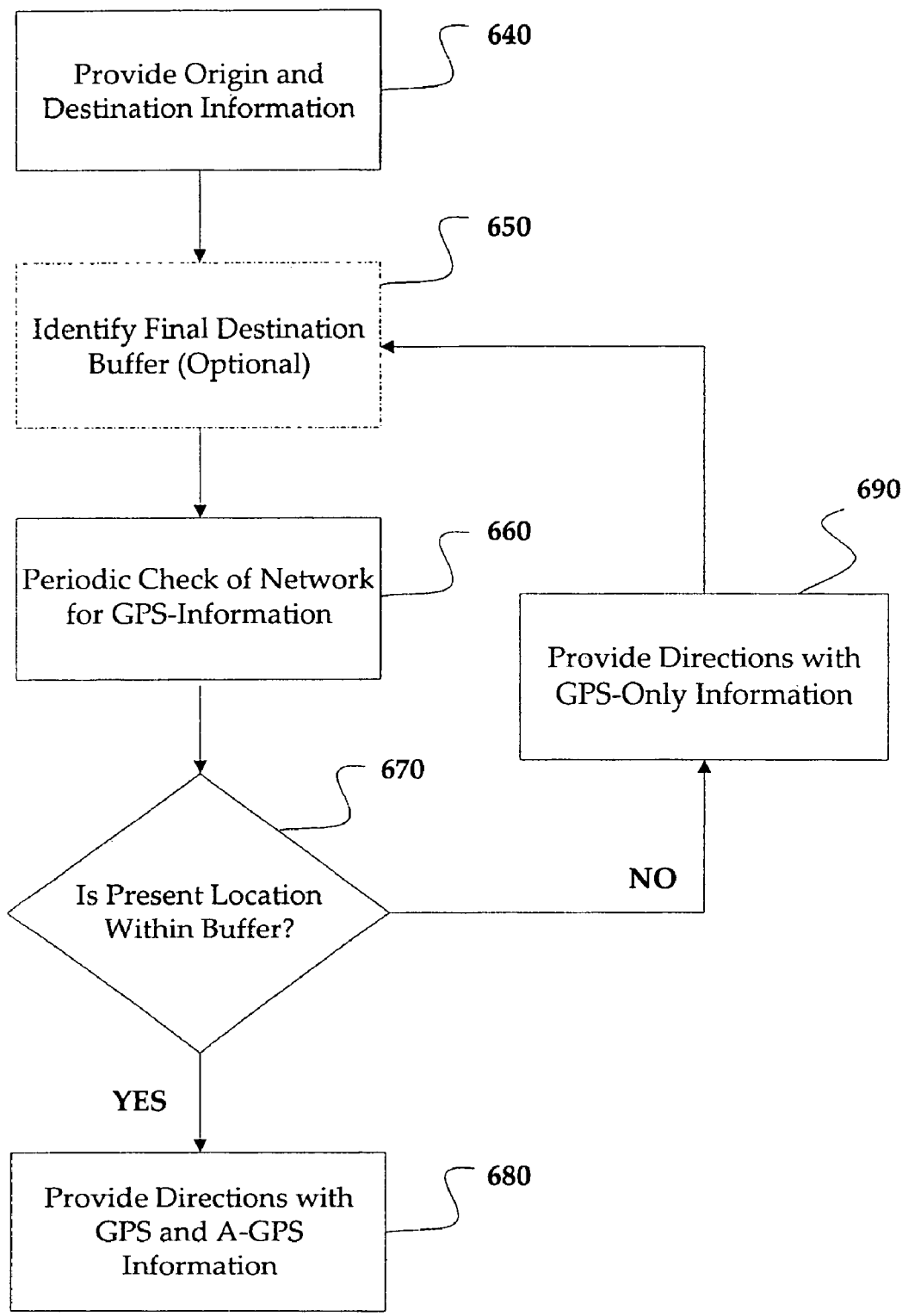

FIG. 6B details an exemplary process for instructing the intelligent activation module 520 (FIG. 5) to operate on a final destination setting. Through use of this setting, less network and battery resources are used prior to arriving at a final destination buffer 630 than will be used after arriving at that buffer 630 when A-GPS resources are utilized that consume more network bandwidth and battery power. A user, utilizing the final destination method, will provide the intelligent activation module 520 with information concerning point of origin and destination in step 640. The user may also provide the intelligent activation module 520 with information pertaining to the size of a final destination buffer 630 in optional step 650; that is, at what point will more detailed turn-by-turn directions be required. As noted, alternative embodiments allow the 'buffer' 630 to be determined by the intelligent activation module 520.

After providing this information and initiating their journey, the GPS module 510 of the user's mobile device 300A will make periodic queries of the GPS network to determine generalized location information in step 660. If, after making a GPS network query, the intelligent activation module 520 recognizes the mobile device 300 to be within the final destination buffer 630, the intelligent activation module 520 will instruct the GPS module 510 to begin utilizing available A-GPS resources to acquire and provide more accurate and more frequent location information that will result in increased frequency and accuracy of turn-by-turn instructions in step 680.

If, however, the intelligent activation module 520 determines that the mobile device 300 is still outside the predetermined final destination buffer 630, the intelligent activation module 520 will continue suppression of A-GPS resources and/or instruct the GPS module 510 to continue making queries solely on the GPS network and not in conjunction with any GSM of A-GPS features. Directions and location will, at this point, be provided based upon a GPS only determination in step 690. The process will then continue with the GPS module making a query of the GPS network (step 660) followed by a determination of whether the location of the device falls within the predetermined buffer region 630 in step 670.

Figure 7:
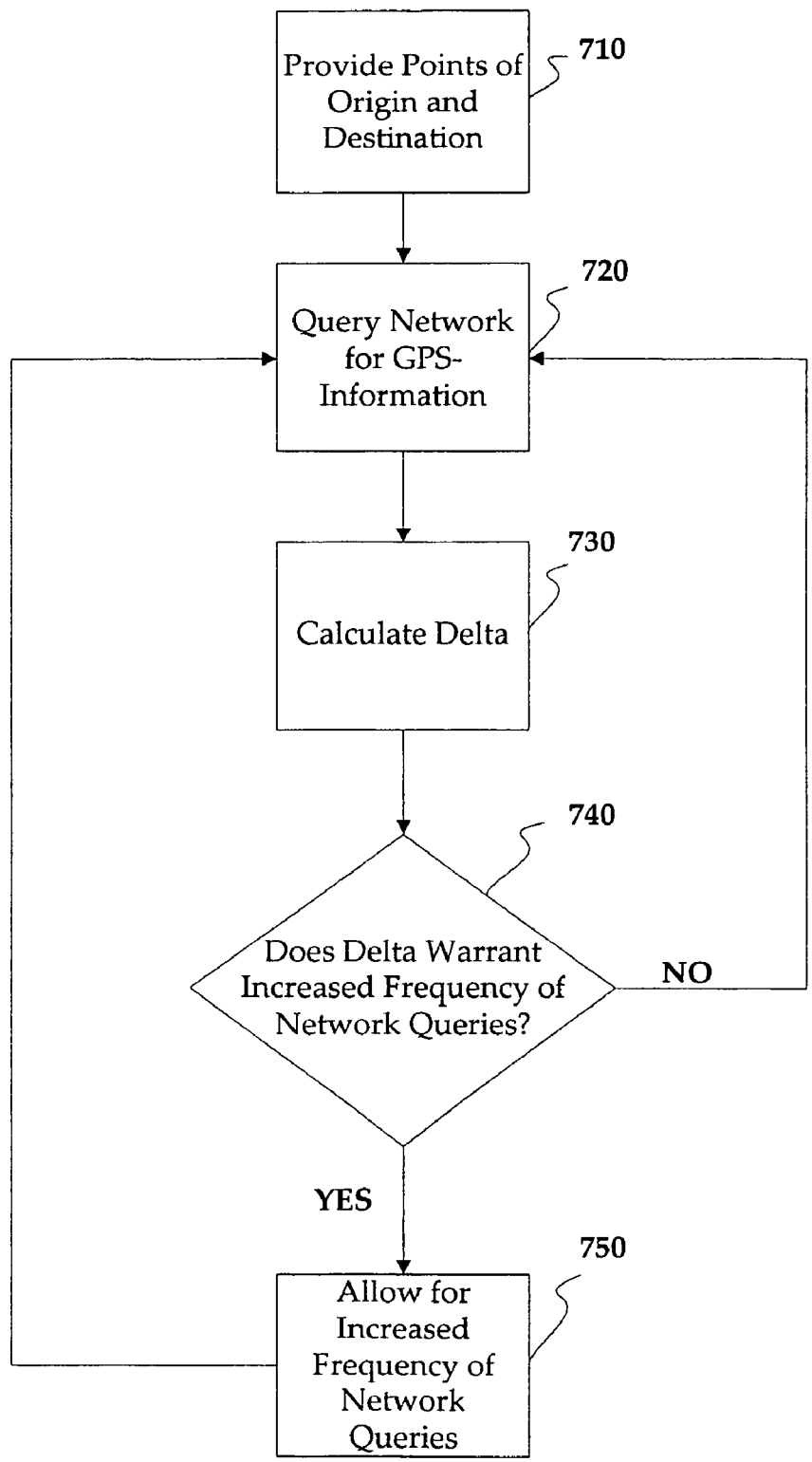
FIG. 7 reflects an exemplary intelligent utilization of GPS resources utilizing deltas and map information.

FIG. 7 reflects an exemplary intelligent utilization of map resources utilizing deltas in map information. Utilizing the delta setting allows the GPS module 510 (FIG. 5) to continually query a GPS or GSM network but at varying periods of frequency. For example, when a user and their mobile device 300 (FIG. 3) depart an initial location, there is a presumption of familiarity with their surroundings. As such, it is not necessary for the user to have up-to-the-minute or real time directions. Updates in location via the GPS module 510 may be appropriate at intervals of, for example, 30 minutes to an hour. As the user gets closer to their destination, which is often an unfamiliar area, there will be an increasing need for more up-to-date (real-time) turn-by-turn directions. For example, a user may now require directions at intervals of anywhere from 1 minute to every few seconds.

The GPS module 510, in conjunction with the intelligent activation module 520, will recognize the mobile device coming in closer proximity of its final destination through deltas in map information. As the delta changes (i.e., proximity to the final destination decreases or, alternatively, the proximity to the initial point of departure increases) as recognized by the GPS module 510, the intelligent activation module 520 will instruct the GPS module 510 to make more frequent queries of the GPS or GSM network in order to obtain the most up-to-date positional information.

For example, and as reflected in FIG. 7, a user will provide a point of origin and a point of destination in step 710. As the user and their GPS-equipped mobile device 300 (FIG. 3) begin traveling from their point of origin to their desired destination, a delta will develop between the user and both their point of origin and their point of destination; increasing and decreasing, respectively. Depending on whether the intelligent activation module 520 (FIG. 5) is programmed to focus on the increasing or decreasing delta, which will result in identical albeit conversely resultant frequency of queries by the GPS module 510 (FIG. 5), the GPS module 510 will begin to make queries of a GPS and/or GSM network in step 720 as is appropriate.

These queries may initially be, for example, every 30 minutes as may be determined by the user or some other presetting (e.g., minimal deltas provide for 1 hour queries whereas significant deltas provide for 30 second queries). The intelligent activation module 520, using location information provided by the GPS module 510, will calculate the delta—change in location—relative to their point of origin or ultimate destination in step 730.

As the delta continues to change (i.e., as the user further distances themselves from their point of origin and decreases the distance to their final destination), the intelligent activation module 520 will interpret the delta to determine whether to allow for increased access of the GPS module 510 to make location intensive queries of the relevant informational network in step 740. Less frequent queries of the network provide less accurate location information. More frequent queries provide for more accurate information and resulting more accurate turn-by-turn directions but at the cost of increased network bandwidth consumption and drain on a battery (i.e., power component 385).

If the determination of the delta shows that the mobile device 300 is becoming increasingly close to its final destination (or, alternatively, increasingly distant from its point of origin), the intelligent activation module will, as noted, allow for increased access to the network in step 750. If the delta is insignificant or does not meet a predetermined setting that will allow for increased. access, the intelligent activation module 520 will allow the GPS module 510 to query the network in accordance with its previously determined frequency.

Figure 8:
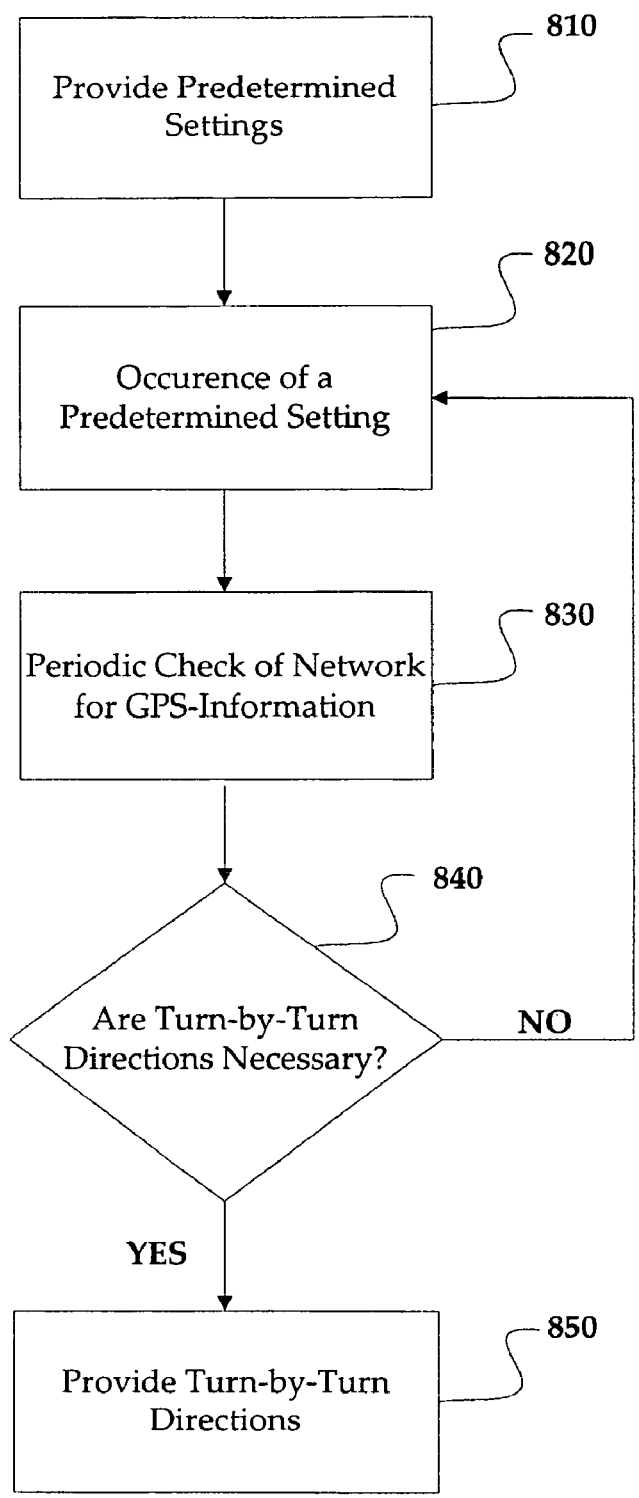
FIG. 8. reflects an exemplary intelligent utilization of GPS resources utilizing predetermined settings.

FIG. 8 reflects an exemplary operational setting whereby a user can preprogram the intelligent activation module 520 (FIG. 5) to activate the GPS module 510 (FIG. 5) for periodic location information (e.g., every 10 minutes, 30 minutes, 1 hour or at whatever time period the user might choose). This setting proves useful if the user recognizes they will be on roads not requiring directions for long periods of time whereby a user uses, for example, a 1 hour period for allowing the GPS module 510 to activate and check for location information.

In this predetermined setting, the user can pre-program the intelligent activation module 520 to permit the GPS module 510 activation and subsequent network access at periods to coincide with time of day (as might be provided by the GSM network) or, in another example, distance traveled (as might be provided by an onboard computer in a vehicle). For instance, if a user knows he will not be needing directions, at least, until 100 miles into their journey, the user can preprogram the intelligent activation module 520 to allow the GPS module 510 to make a GPS locality check only after a certain distance has been traveled or passage of time has expired.

If the intelligent activation module 520, in conjunction with the GPS module 510, then recognizes that the vehicle and mobile device 300 (FIG. 3) are approaching the final destination and that turn-by-turn directions will soon be necessary, the intelligent activation module 520 will instruct, or permit, activation of the GPS module 510 that will, in turn, provide the necessary turn-by-turn directions. A determination that turn-by-turn directions will be, or presently are, necessary is an additional predetermined setting that can be provided by the user (e.g., provide turn-by-turn directions when within 30 miles of the final destination).

For example, and as reflected in FIG. 8, the user can preprogram the intelligent activation module 520 with certain predetermined settings in step 810. Thus, for example, the settings may allow the GPS module 510 to activate and access the GSM/GPS network every 30 minutes and to recognize that turn-by-turn directions will be required when the mobile device 300 is within 25 miles of the final destination.

Upon the expiration of 30 minutes, that is, the occurrence of a predetermined setting in step 820, the intelligent activation module 520 will allow the GPS module 510 to make a periodic location check in step 830. If the location of the vehicle and mobile device 300 coincides with a predetermined setting as to when turn-by-turn directions will be necessary in step 840 (e.g., the vehicle and mobile device 300A are within 25 miles of the final destination), then the intelligent activation module 520 will further allow the GPS module 510 to make regular and unhindered queries of the relevant network to provide such directions in step 850.

Similar queries can be made with regard to distance traveled as may be determined by the GPS module 510 and intelligent activation module 520 or as may be more directly reflected by on-board computer information from the vehicle.

Figure 9A:
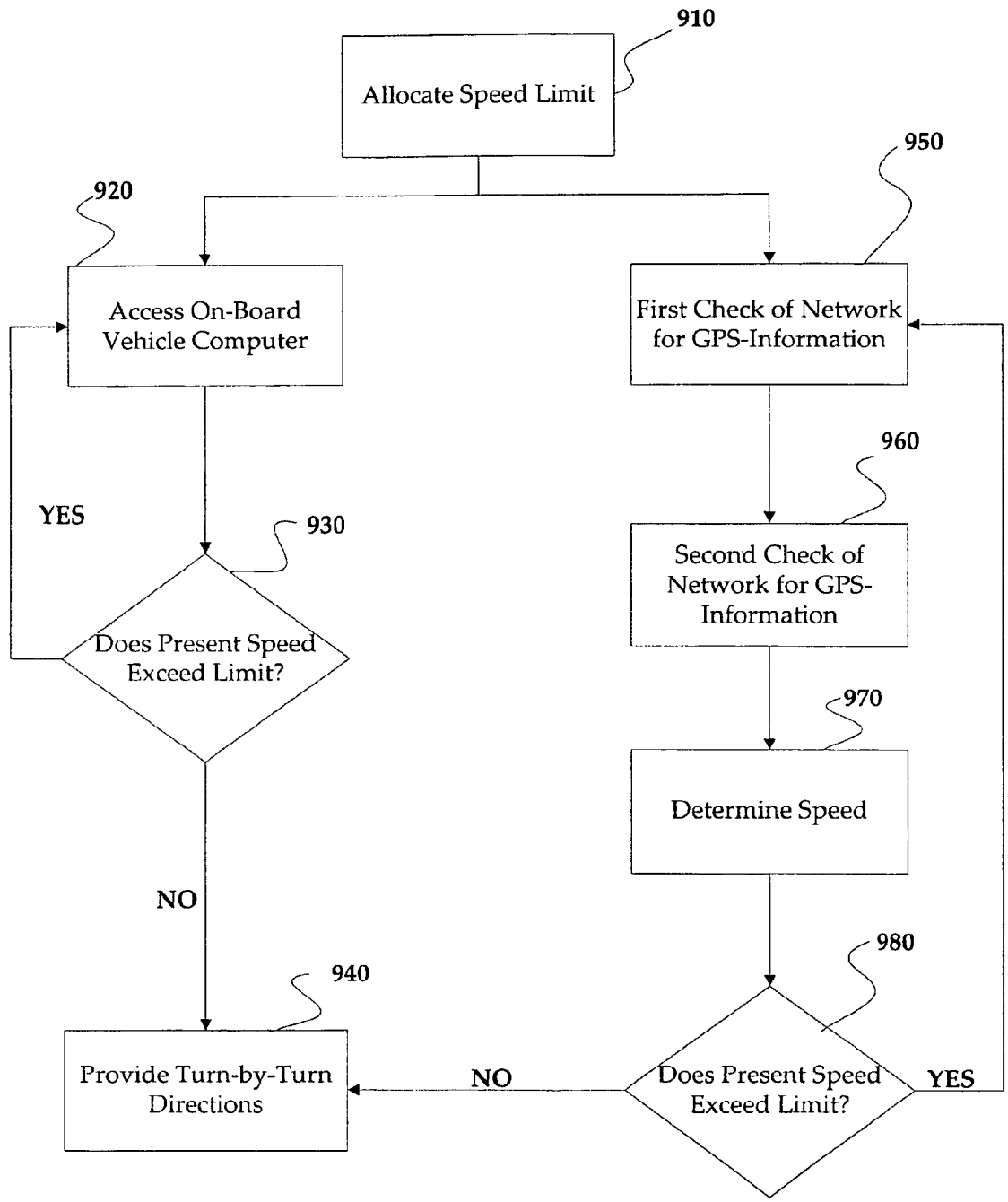
FIG. 9 reflects an exemplary intelligent utilization of GPS resources utilizing speed information.

Referring now to FIG. 9, an exemplary embodiment of the present invention is depicted whereby GPS resources are intelligently utilized using speed information. Activation of the GPS module 510 (FIG. 5) can be made subject to the speed of the mobile device 300A (FIG. 3A) containing the GPS module 510. That is, a vehicle in which the mobile device 300A is located and its speed of travel can affect the regularity at which the GPS module 510 is activated or, alternatively, the time at which it is suppressed and prevented from accessing a GPS and/or GSM network.

Figure 9B:
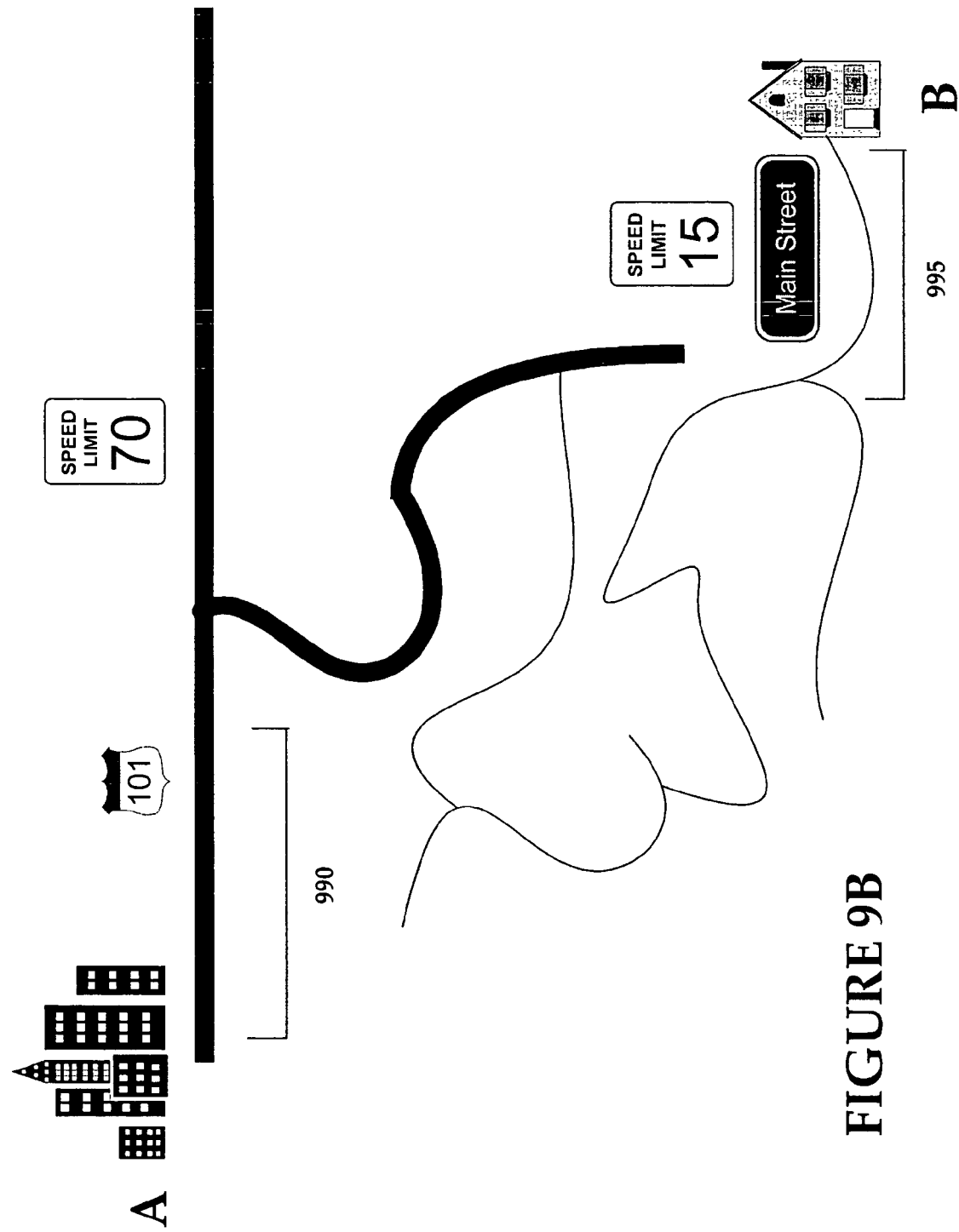

For example, if a vehicle is traveling at 70 miles per hour, it is likely that the vehicle (and the mobile device 300 traveling therein) is traveling on a highway 990 as is reflected in FIG. 9B. Highway travel, generally, will not require turn-by-turn directions as can be offered by the GPS module 510 as the vehicle is traveling in a mostly direct route from point A to point B. As such, the intelligent activation module 520 in the mobile device 300 can recognize a high speed of travel being equivalent to highway driving, and make an intelligent determination that the user does not require continuous turn-by-turn directions or, at least, providing of location and/or direction at a more sporadic interval. Through the less regular activation of the GPS module 510, there is a resulting less drain on the battery (i.e., power component 385) and network bandwidth resources.

A determination of speed can be made in a variety ways. In an exemplary embodiment, the mobile device 300 containing the GPS module 510 can interface directly with the vehicle through an on-board computing device 920 providing information such as speed. This intelligent activation module 520, based on that speed information, makes a determination 930 of when the GPS module 510 should be activated to make regular and resource intensive queries of the relevant GSM and/or GPS networks. In this instance, the determination 930 will be based on whether the vehicle and mobile device 300 are exceeding a certain speed equated to highway travel therein reflecting the lack of a need for turn-by-turn directions 940 as would be offered through activation of the GPS module 510.

In another embodiment, the GPS module 510 can be activated on a pre-determined schedule or on some other dynamic basis, as might be programmed into the intelligent activation module 520, to make a quick-determination of location since the previous GPS module 510 activation and locale determination to, in turn, allow for deduction of distance traveled and, based on time elapsed, the average speed for traversing that distance. Based on that speed, the intelligent activation module 520 will determine if regular queries to a GSM and/or GPS network are necessary for turn-by-turn directions.

For example, if the GPS module 510 is first activated 950 (e.g., at 1:00 PM) and makes a determination that the mobile device 300 is at one locale and, later, is re-activated 960 (e.g., at 2:00 PM) and determines the mobile device 300 to be at a second locale, the intelligent activation module 520, through any variety of mathematical algorithms for measuring distance or alternatively, acquiring such information from, for example, a map database can determine that the distance between the two query points is 75 miles. As the mobile device 300 traveled that 75 mile distance in one hour, the intelligent access module 520 can then determine that the average speed 970 for the mobile device 300 is 75 miles per hour (75 miles/1 hour=75 miles per hour). Recognizing this speed to be indicative of highway travel 980, the intelligent activation module 520 will instruct the GPS module 510 that turn-by-turn directions are not presently necessary thereby causing the GPS module 510 to shut down (or remain in that state) or to otherwise enter a 'sleep' or 'hibernation' mode whereby the GPS module 510 will not unnecessarily consume battery power or network bandwidth. If the speed does not exceed a predetermined speed, then the intelligent activation module 520 will permit activation of the GPS module 510 to provide turn-by-turn directions 940.

The intelligent activation module 520, in this operational setting, can be programmed with a variety of variables. For example, the speed to be equated with highway driving can be determined by the user 910. That is, the user can program the intelligent activation module 520 to equate travel over a speed of 55 miles per hour with highway or some other locale of travel not requiring regular GPS module activation 520 and providing of turn-by-turn directions.

The speed can be set to any speed as, for example, a driver might be generally familiar with city streets in a certain area where the user might travel at speeds of approximately 30-45 miles per hour. The user, however, might be unfamiliar with a certain neighborhood 995 where the user would travel at a speed of only, for example 10-15 miles per hour. In this example, the user might preprogram the intelligent activation module 520 to only activate the GPS module 510 for turn-by-turn directions when the speed is not in excess of 15 miles per hour (that is, the user is on unfamiliar neighborhood streets and requires detailed directions).

In an alternative embodiment, the frequency at which queries are made by the GPS module 510 can be made inverse to speed. That is, the slower a vehicle travels, the more frequent the queries of the relevant information network.

All of the aforementioned settings and programming of the intelligent activation module 520 can be achieved either by voice instruction, through keypad entry or via a remote terminal that subsequently provides module programming instructions via a wireless transmission.

The above-described embodiments are exemplary. One skilled in the art will recognize and appreciate various applications of the disclosed invention beyond those presently described here. This disclosure is not meant to be limiting beyond those limitations as expressly provided in the claims.

What is claimed is:

1. A mobile device comprising: a GPS module configured to receive location based information; an intelligent activation module configured to regulate power consumption and network bandwidth consumption by the GPS module based on at least one control setting; and one or more input/output (I/O) components configured to interact with the GPS module and the intelligent activation module to provide turn-by-turn directions to a user based on desired destination information and the at least one control setting.

2. The mobile device of claim 1, wherein the I/O components comprise a display, a keypad, a speaker, and a microphone.

3. The mobile device of claim 1, wherein the desired destination information is provided to the mobile device by a remote computer terminal.

4. The mobile device of claim 1, wherein the desired destination information is provided to the mobile device by at least one of the I/O components.

5. The mobile device of claim 2, wherein the turn-by-turn directions are provided to the user as a combination of text and graphics on the display.

6. The mobile device of claim 2, wherein the turn-by-turn directions are provided to the user audibly by the speaker.

7. The mobile device of claim 1, wherein the GPS module is configured to receive the location based information from at least one network providing location based information.

8. The mobile device of claim 7, wherein the at least one network comprises a GPS network.

9. The mobile device of claim 7, wherein the at least one network comprises an A-GPS network.

10. The mobile device of claim 1, wherein the at least one control setting comprises a speed information setting.

11. The mobile device of claim 1, wherein the at least one control setting comprises a final destination setting.

12. The mobile device of claim 1, wherein the at least one control setting comprises a delta setting.

13. The mobile device of claim 1, wherein the at least one control setting comprises a user-predetermined setting.

14. The mobile device of claim 1, further comprising a timing module configured to correct timing discrepancies in the location based information received from the at least one network providing location based information.

15. A method for intelligently utilizing resources in a GPS-capable mobile device, comprising: receiving destination information; receiving final destination buffer information; and accessing a location based information network to obtain location information at time intervals associated with the final destination buffer information.

16. The method of claim 15, further comprising determining the mobile device to be within a final destination buffer as defined by the final destination buffer information and as reflected by the location information received from a plurality of GPS-satellites over a GPS-only network.

17. The method of claim 16, further comprising accessing at least an A-GPS network to obtain location information if the mobile device is determined to be within the final destination buffer as defined by the final destination buffer information.

18. A method for intelligently utilizing resources in a mobile device, comprising: receiving an indicia of speed at the mobile device; accessing an onboard computer in a vehicle to determine a speed of the vehicle; determining whether the speed of the vehicle is greater than the indicia of speed; and if the speed of the vehicle is greater than the indicia of speed, accessing location based information over the at least one network.

19. The method of claim 18, further comprising providing turn-by-turn directions to a user of the mobile device that correspond to the location based information and a final destination of the user.

20. The method of claim 18, wherein the location based information is GPS-information.

21. The method of claim 18, wherein the indicia of speed is determined by an intelligent activation module.

22. The method of claim 18, wherein the indicia of speed is determined in accordance with a user setting.

23. A method for intelligently utilizing resources in a mobile device, comprising: receiving an indicia of speed at the mobile device; accessing an onboard computer in a vehicle to determine a speed of the vehicle; determining whether the speed of the vehicle is less than the indicia of speed; and if the speed of the vehicle is less than the indicia of speed, accessing location based information over the at least one network.

24. The method of claim 23, further comprising providing turn-by-turn directions to a user of the mobile device that correspond to the location based information and a final destination of the user.

25. The method of claim 23, wherein the location based information is GPS-related information.

26. The method of claim 23, wherein the indicia of speed is determined by an intelligent activation module.

27. The method of claim 23, wherein the indicia of speed is determined in accordance with a predetermined user setting.

28. A method for intelligently utilizing resources in a mobile device, comprising: receiving an indicia of speed at the mobile device; accessing an onboard computer in a vehicle to determine a speed of the vehicle; determining a relationship between the speed of the vehicle and the indicia of speed; and accessing location based information over the at least one network based on the relationship.

29. The method of claim 28, further comprising providing turn-by-turn directions to a user of the mobile device that correspond to the location based information and a final destination of the user.

30. A method for intelligently utilizing resources in a mobile device, comprising: receiving an indicia of speed; accessing location based information over at least one network to obtain first location information ($L_1$) and a first indication of time ($T_1$); accessing location based information over the at least one network to obtain second location information ($L_2$) and a second indication of time ($T_2$); and determining present speed according to a distance differential based on location information and indications of time.

31. The method of claim 30, further comprising determining whether the present speed of the mobile device is less than the indicia of speed;

and if the present speed of the mobile device is less than the indicia of speed, accessing location based information over the at least one network.

32. The method of claim 31, further comprising providing turn-by-turn directions to the user based on the location based information and a final destination of the user.

33. The method of claim 30, wherein the location based information is GPS-related information.

34. The method of claim 30, further comprising determining whether the present speed of the mobile device is greater than the indicia of speed; and if the present speed of the mobile device is greater than the indicia of speed, denying access to location based information over the at least one network.

* * * * *